Sept. 14, 1943.   G. H. RENTFRO   2,329,296
PISTON RING
Filed May 21, 1941

Inventor:
Gerald H. Rentfro
By McCanna, Wintercorn & Morsbach
Attys.

Patented Sept. 14, 1943

2,329,296

UNITED STATES PATENT OFFICE 2,329,296

PISTON RING

Gerald H. Rentfro, Riverside, Calif.

Application May 21, 1941, Serial No. 394,404

1 Claim. (Cl. 309—45)

This invention relates to a new and improved piston ring for use in internal combustion engines.

The conventional oil control ring is usually a one-piece ring having a circumferential groove approximately .030" deep around the periphery and of less width than the ring so as to allow approximately .030" land on the upper and lower edges for contact with the cylinder wall. This channel groove has a series of slots communicating with it, milled through the ring, to allow oil scraped off the wall into the groove to drain to the inner side of the ring and thence through holes communicating with the ring groove in the piston back into the crank case. The principal objection to such rings has been their tendency to clog with carbon, and a further objection I have noticed is that there is insufficient oil scraping action in the first instance to obtain satisfactory results even in the absence of objectionable clogging. It is, therefore, the principal object of my invention to provide an oil control ring of anti-clog design, and one which also affords an increased number of oil scraping edges.

The oil control ring of my invention has the ring body proper made in two parts, the cast iron upper and lower sections of the ring being separated by a circular steel segment. The cast iron sections are each provided with an outer circumferential oil groove and radial slots for oil drainage, similarly as in the conventional one-piece ring. With this improved construction the circular steel segment affords two additional scraping edges, so that whereas the conventional one-piece ring afforded only four scraping edges, my improved construction affords six, and whereas the conventional one-piece ring had a tendency to clog, my improved ring with the thin circular steel segment provided between the upper and lower sections thereof insures sufficient relative movement between the parts to prevent the accumulation and solidification of carbon sludge particles in the slots and grooves so that free passage of oil inwardly from the outer peripheral scraping edges is always assured. Incidentally the thin circular steel segment agitates the oil in the slots and channels to stimulate flow and thus assure speedier drainage inwardly from the peripheral scraping edges. The individual pieces of my improved three-piece ring being of smaller section individually are more readily conformable to the cylinder bore and follow the wall more closely, thus assuring more efficient scraping action of the scraping edges on the individual pieces, this being a particularly important advantage where the cylinder bore happens to be tapered excessively, or to any extent.

The three-piece oil control ring of my invention is further materially improved by the provision of a novel spring expander ring which differs from the usual humped expander ring in having elongated circumferentially extending slots in the hump portions into which the inner peripheral edge portion of the circular steel segment projects, the steel segment being several thousandths larger in radial depth than the cast iron ring sections, so as to project into the slots while the expander ring engages the inner periphery of the cast iron ring sections to expand the latter independently of the steel segment, at least until the cast iron sections have worn down enough or "run in" to permit the expander ring to make contact with the inner periphery of the steel segment.

These various features of my invention are illustrated in the accompanying drawing, in which—

The same reference numerals are applied to corresponding parts throughout the views.

Figure 1:
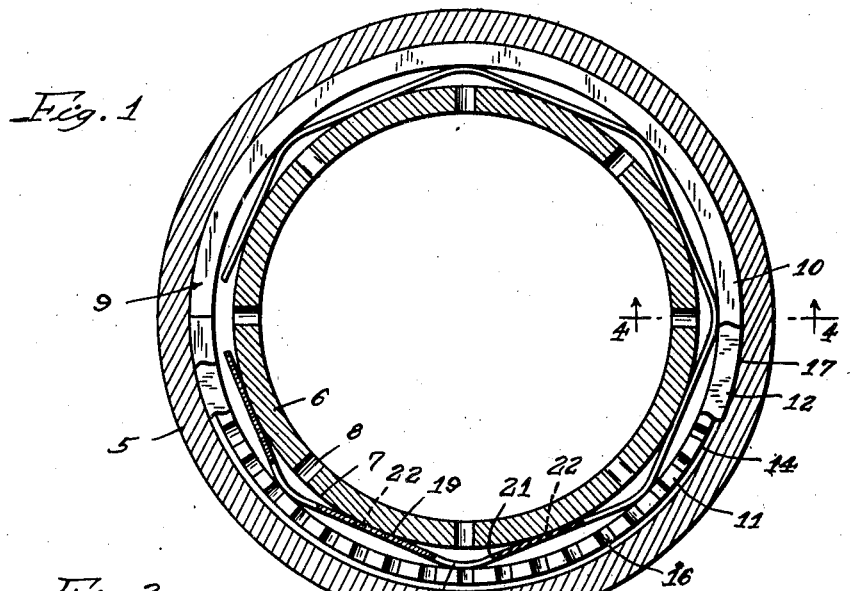
Figure 1 is a horizontal section through a cylinder and piston, in which the groove in the piston contains an oil control ring made in accordance with my invention, certain portions of the ring being broken away to better illustrate its construction.
Figure 2:
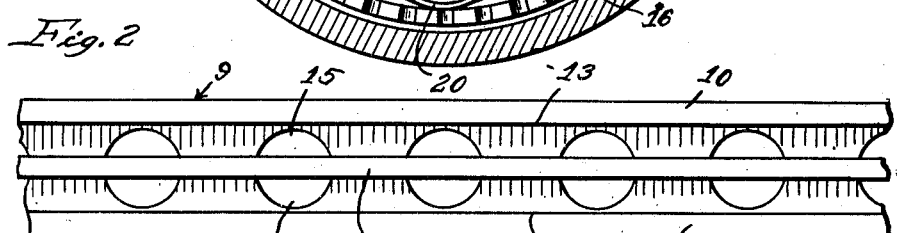
Fig. 2 is a fragmentary view looking at the outer periphery of the ring, the same being shown on a larger scale than in Fig. 1.
Figure 3:
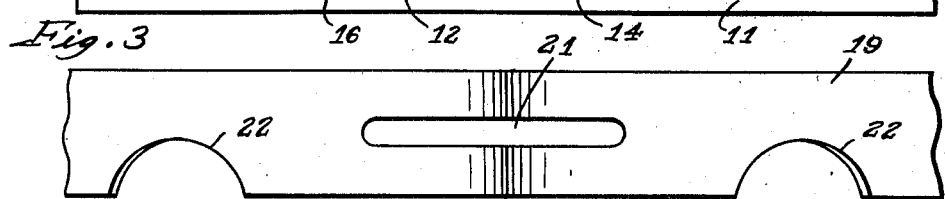
Fig. 3 is a similar view of the spring expander ring.

In Fig. 1 the reference numeral 5 designates a cylinder of an internal combustion engine in which a piston 6 is reciprocable. These parts may be considered as illustrative of any conventional type of piston and cylinder. The piston has a piston ring groove 7, with which a number of drain ports 8 communicate for drainage of oil back to the crank case in the usual way. The oil control ring indicated generally by the reference numeral 9 in the groove 7 is made in accordance with my invention.

The piston ring 9 in accordance with my invention comprises upper and lower cast iron ring sections separated by a thin steel ring segment 12. The ring sections 10 and 11 have outer peripheral oil collecting grooves 13 and 14 provided therein, and have radially extending holes or slots 15 and 16 communicating with these grooves to drain oil therefrom to the inner periphery of the ring for ultimate drainage back to the crank case through the ports 8 in the wall of the piston. The ring sections 10 and 11 and segment 12 have their outer peripheries in close contact with the cylinder wall 17, and since each of these three parts provides two scraping edges, the ring assembly has a total of six scraping edges as against only four in the conventional one-piece ring.

Figure 4:
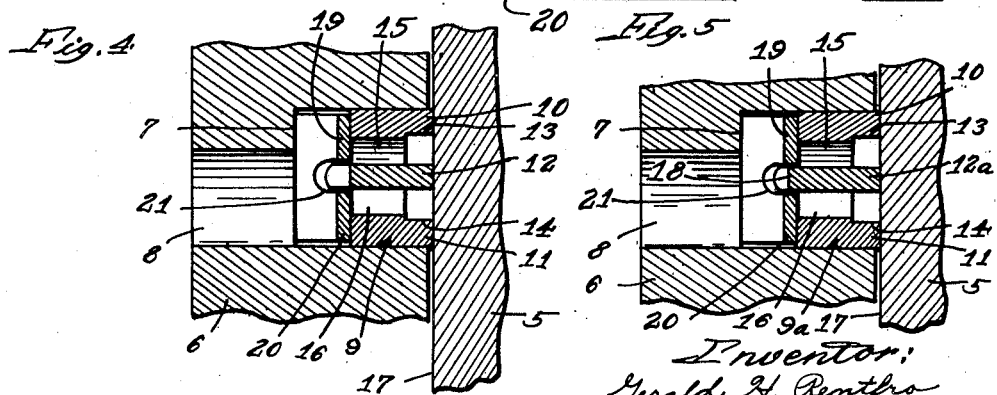
Fig. 4 is a vertical sectional detail on the line 4—4 of Fig. 1, but on the same scale as Figs. 2 and 3.
Figure 5:
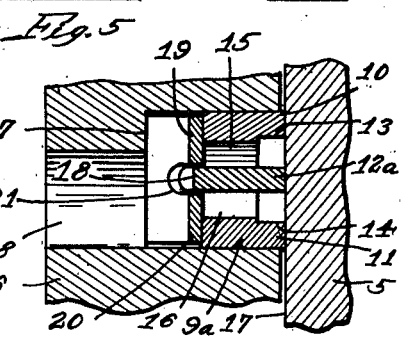
Fig. 5 is a sectional detail similar to Fig. 4, but illustrating a modified or alternative construction.

In the construction of Figs. 1 to 4, the steel segment 12 has the same radial depth as the cast iron sections 10 and 11. However in the modification shown in Fig. 5, the steel segment 12a is several thousandths larger in radial depth than the cast iron sections 10 and 11, so that the inner peripheral edge portion 18 projects radially inwardly beyond the inner peripheries of the sections 10 and 11. An expander ring 19 of spring steel of wavy form is inserted in the grooves 7 behind the piston rings 9 and 9a, as illustrated in Figs. 4 and 5, with the circumferentially spaced hump portions 20 in contact with the inner periphery of the rings to urge the same into closer wiping contact with the cylinder wall 17. These expander rings have elongated slots 21 provided therein in the hump portions midway between the upper and lower edges of the ring. These slots 18 in the case of the construction of Figs. 1 to 4 leave the steel segment 12 free of the expansive action of the expander ring 19, the latter having contact only with the cast iron sections 10 and 11. However in the modified construction of Fig. 5, due to the fact that the inner edge portion 18 of the steel segment 12a protrudes to a certain extent beyond the inner peripheries of the cast iron sections 10 and 11 into the slots 21, the expander ring 19 is adapted eventually to come into contact with the inner periphery of the steel segment 12a when the cast iron sections 10 and 11 have "run in," the steel segment 12a at that time coming into contact with the expander ring 19 at the ends of the slots 21. The steel segment 12 in both constructions has sufficient tension of its own to hug the cylinder wall properly without the aid of the expander ring. These slots 21 serve to some extent to drain oil from the slots 15 and 16, although the expander rings 19 are cut away at points midway between the hump portions 20, as indicated at 22 in Fig. 3, for the free passage of oil inwardly from the piston ring to the ports 8.

In operation, the present three-piece ring 9 follows the cylinder wall 17 more closely than a conventional one-piece ring 9 or 9a, because each of the parts 10, 11, and 12 or 12a is expansible independently of the others. This is of particular advantage where the bore is tapered, each section in that event expanding to take its own seat. The small cross-section of the cast iron sections 10 and 11 makes them more responsive to the spring expander ring 19, thus insuring closer contact of the scraping edges with the cylinder wall and accordingly making for more efficient oil scraping action. The relative movement permitted between the parts 10, 11, and 12 or 12a is of great advantage in preventing the clogging of the ring 9 or 9a with carbon sludge, that being one of the principal causes of the failure of the conventional oil control rings. The thin steel segment 12 or 12a furthermore provides sufficient agitation for the oil in the slots 15 and 16 and channels 13 and 14 to hasten the drainage of oil inwardly toward the ports 8. During the first use of the ring 9a, say for about five thousand miles, the expander ring 19 acts only on the sections 10 and 11, the steel segment 12a having sufficient spring tension so that it requires no expander spring action thereon. However, after the cast iron sections 10 and 11 have "run in," the expander ring 19 bears on the steel segment 12a also, and from that point on there is substantially equally balanced but somewhat lighter expansive spring action exerted on all three parts of the ring 9a.

It is believed the foregoing description conveys a good understanding of the objects and advantages of my invention. The appended claim has been drawn to cover all legitimate modifications and adaptations.

I claim:

A piston ring comprising two cast ring members, each having a circumferentially extending groove provided in the outer periphery at one edge portion, said ring members being disposed one over the other with the grooved edges adjacent one another so as to provide a continuous annular groove around the assembled ring, the two ring members having spaced apart radial passages therethrough communicating with the aforesaid grooves, a third ring member of thin flat steel inserted between the two first named ring members having substantially the same outer diameter as said first named ring members, so that the outer edge portion of said third ring member extends across and divides the aforesaid annular groove into two grooves from which the radial passages lead above and below the third ring member, said third ring member having a greater radial depth than the first named ring members so as to provide an inner peripheral edge portion which projects radially inwardly relative to the inner peripheries of the first named ring members, and a spring expander member adapted to be located within and against the inner peripheries of all of said ring members, said expander being of a generally circular form but having circumferentially spaced radially outwardly directed hump portions, the hump portions having slots provided therein communicating with the radial passages both above and below the third ring member, said slots being elongated circumferentially with respect to said expander and having the inner peripheral edge portion of said third ring member projecting therein freely, the ends of said slots being normally radially inwardly spaced from the inner periphery of said third ring member but arranged to contact said periphery when the first named ring members are expanded to a predetermined extent.

GERALD H. RENTFRO.